July 22, 1930. C. F. HARLEY ET AL 1,771,296
APPLIANCE FOR PEELING ORANGES AND LIKE FRUITS
Filed Jan. 9, 1929
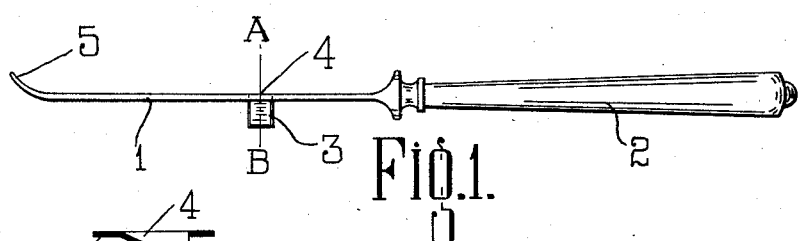
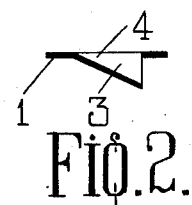
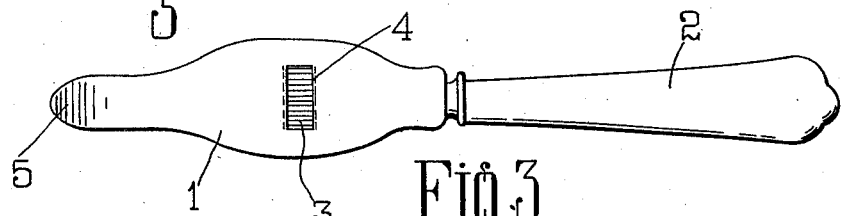
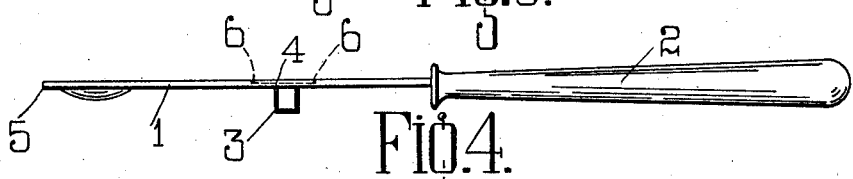
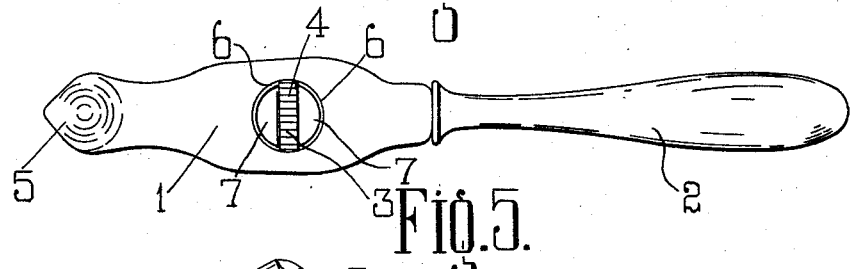
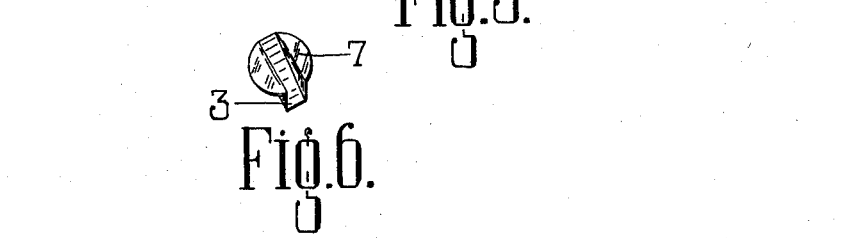
INVENTORS
Cecil Francis Harley, +
John Carruthers Paterson
BY
Knight Bro
ATTORNEYS Patented July 22, 1930

1,771,296

UNITED STATES PATENT OFFICE

CECIL FRANCIS HARLEY AND JOHN CARRUTHERS PATERSON, OF LONDON, ENGLAND

APPLIANCE FOR PEELING ORANGES AND LIKE FRUITS

Application filed January 9, 1929, Serial No. 331,318, and in Great Britain July 2, 1928.

This invention relates to an improved appliance for peeling oranges, lemons and like fruits.

The improved appliance, according to this invention comprises a blade provided with a handle, a transverse opening or slot in the blade, and a cutter of substantially U, V or other suitable channel form in cross section projecting downwards from the under side of the blade below the said transverse opening or slot, the cutter being longitudinally of wedge-shape, with its bottom sloping upwards from the lower cutting end towards the top surface of the blade.

By this construction, the strip of peel cut and raised by the cutting edges runs up the upwardly-sloping bottom of the cutter and emerges through the opening on the top of the blade.

The distal end of the blade is intended to be used to remove the rest of the peel, and for this purpose is preferably made with a blunt or rounded point, or if desired may be made more or less spoon-shaped, or of other suitable shape.

The cutter is preferably arranged at or about the middle wider part of the blade.

The cutter may be made integral with the blade, or separate from the blade and attached to the blade by brazing or in other desired manner below the opening in the blade.

In a modification, the blade is transversely slotted to receive the cutter and allow it to project on the lower side thereof, and is recessed on its upper surface at two opposite sides of the slot to receive a pair of segmental flanges at the top of the cutter.

The blade, which can be made of any suitable material, may be made in one with a handle, or fixed at one end to a separate handle, which may be of any suitable material such as wood, metal, ivory, mother-of-pearl, or the substances known under the registered trade-marks "Erinoid" and "Xylonite."

The invention will be further described with reference to the accompanying drawings, in which two examples of construction of our appliance are illustrated. In these drawings:—

Figure 1 is a side elevation of one form of construction;

Figure 2 a cross section on the line A—B of Figure 1, and

Figure 3 a plan view of Figure 1.

Figure 4 is a side elevation of a modified form of construction and

Figure 5 a corresponding plan view, while

Figure 6 is a perspective view of the cutter according to this modification.

Referring first more especially to the construction shown in Figures 1–3, 1 is the blade of the appliance, and 2 the handle, which in this case is made integral with the blade. 3 is the cutter, which is attached to the lower side of the blade below the transverse slot 4, such as by brazing or in other suitable manner, or again the complete article may be made from a solid piece of metal.

This cutter is U or V-shape or other suitable channel shape in cross section, and longitudinally is of wedge shape, as shown in Figure 2, so that the three edges at the lower, front end of the channel form the cutting edges, whilst the bottom slopes upward towards and merges into the top surface of the blade 1. It will be understood that the amount of projection of the lower end of the channel-shaped cutter 3 below the lower face of the blade determines the thickness of the strip of peel cut out of the fruit.

The blade 1, it will be seen, is made wider at or about its middle portion where the cutter is situated, for instance as shown in the plan views, Figures 3 and 5.

At its free or distal end the blade 1, in the construction shown in Figures 1–3, is narrowed and made with a blunt or rounded point 5, and, if desired, this blunt end may be somewhat upturned after the fashion of a grape-fruit knife, as indicated in Figure 1. This distal end of the blade, which is intended for use in removing the rest of the peel by being forced under the same may, however, be of any shape which will enable it to be used effectively for the purpose intended. For example, as shown in Figures 4 and 5, it may be spoon-shaped, and slightly concave or hollowed out on its upper surface.

In use, the cutting edges of the cutter 3 are pressed against the rind of the fruit to be peeled, with the lower side of the blade bearing on the fruit, and a groove is formed around the fruit, the strip of peel cut and raised passing up the upwardly-sloping bottom of the channel-shaped cutter and out through the opening 4 in the blade. Any number of strips of peel can thus be neatly and easily removed without breaking into the flesh of the fruit. The outer blunt end of the blade is then used to remove the rest of the peel by forcing it under the same.

In the modification shown in Figures 4-6 the cutter 3 is secured in the transverse slot 4 in the blade, so as to project on the lower side of the blade, and the blade is recessed on its upper surface on opposite sides of the slot 4 with segmental recesses as indicated at 6, to receive segmental, lateral flanges 7 on the top of the cutter.

In this modification the blade 1 is shown as being made with a spoon-shaped distal end 5, which is also slightly concave or hollowed out on its upper surface. It will be understood, however, that in this case also the appliance might be made with a blunt and upturned end as in the construction shown in Figures 1-3 or be otherwise suitably shaped to serve the purpose for which it is intended. In the form of appliance shown in Figures 4 and 5 the blade is shown fixed in a separate handle, which may be of any suitable material, as above mentioned.

If desired, in some cases, the cutter channel might be made to increase gradually in width towards its rear end to facilitate the egress of the cut strip of peel and to avoid any possibility of the peel jamming in the channel.

The appliance according to our invention forms a neat and effective implement for the purpose specified.

We declare that what we claim is:—

An appliance for peeling oranges, lemons and like fruits, comprising a blade having a blunt point at its distal end, a handle at the other end of said blade, a transverse slot in the blade, a segmental recess in the upper face of the blade on each side of the transverse slot, a cutter of channel form in cross section secured in the said transverse slot in such a manner as to project downwards from the under side of the blade, the said cutter having segmental flanges adapted to fit in the segmental recesses in the blade, and the said cutter being longitudinally of wedge shape with its bottom sloped upwards from its lower cutting end.

In witness whereof, we have hereunto signed our names this 20th day of December, 1928.

CECIL FRANCIS HARLEY.
JOHN CARRUTHERS PATERSON.